(12) United States Patent
Leger

(10) Patent No.: US 6,564,506 B1
(45) Date of Patent: May 20, 2003

(54) GRAVESTONE PLANTER AND KIT

(76) Inventor: Janet Leger, 151-D North St., Newtonville, MA (US) 02460

( * ) Notice: Subject to any disclaimer, the term of this patent is extended or adjusted under 35 U.S.C. 154(b) by 0 days.

(21) Appl. No.: 10/044,752

(22) Filed: Jan. 14, 2002

(51) Int. Cl.[7] .............................. A01G 5/00; A01G 9/02
(52) U.S. Cl. ........................ 47/41.01; 47/65.5; 47/66.1; 47/86
(58) Field of Search .............................. 47/18, 65, 65.5, 47/66.1, 66.3, 68, 86, 40, 41.01, 85, 39; 40/124.5; D99/17; 52/103; 119/74; 248/27.8; 206/423

(56) References Cited

U.S. PATENT DOCUMENTS

| | | | |
|---|---|---|---|
| 876,235 A | * | 1/1908 | Quackenboss |
| 2,223,074 A | * | 11/1940 | Martin |
| 2,319,243 A | * | 5/1943 | Livingston |
| 2,732,091 A | * | 1/1956 | Kass |
| 3,164,343 A | * | 1/1965 | Cucullo |
| 3,310,911 A | * | 3/1967 | Boser et al. |
| 4,640,045 A | * | 2/1987 | Nesbitt et al. ................. 47/66 |
| 5,133,489 A | * | 7/1992 | Loew et al. ............. 224/42.39 |
| 5,368,266 A | * | 11/1994 | Allen ....................... 248/231.4 |
| 6,209,260 B1 | * | 4/2001 | Surette ........................ 47/65.5 |

FOREIGN PATENT DOCUMENTS

| | | | | |
|---|---|---|---|---|
| FR | 2641443 | * | 1/1989 | ............ A01G/9/02 |

* cited by examiner

Primary Examiner—Michael J. Carone
Assistant Examiner—Andrea Valenti

(57) ABSTRACT

The present invention discloses a gravestone planter and kit used to construct a generally rectangular flower box having a continuous open trough capable of retaining potting soil and having a central open cavity in the middle of the flower box. The width and length dimensions of the constructed flower box are adjustable by slidably moving four separate interconnected corner pieces. By adjusting the width and length of the constructed flower box, the central cavity can be expanded to substantially match the particular dimensions of the top of a given post, such as the top of a gravestone. The dimensionally adjusted flower box may then be mounted around the top of any post that the central cavity of the flower box fits around. Mounting the flower box around the top of a given post is achieved by using at least one strap attached to two opposing sides of the flower box so that the middle of the strap and contacting the top portion of the post. The flower box is consequently suspended around the top of the post by using gravity to secure the flower box in place.

16 Claims, 3 Drawing Sheets

GRAVESTONE PLANTER AND KIT

FIELD OF THE INVENTION

The present invention relates to an apparatus for displaying graveside adornment, such as flowers, memorial decorations and the like, placed on top of grave marking stones. Particularly, this invention relates to a kit for making a removable adornment planter that may be mounted on a variety of grave marking stones without damaging or marking the stone.

DESCRIPTION OF THE PRIOR ART

It is customary to place decorations adjacent to a gravestone or other grave markers. Typically, a container having flowers or other decorations therein is mounted or attached to such a stone, or placed near the stone on the ground. Cemetery groundskeepers find memorials placed on the ground near the grave to be obstacles that are difficult to maneuver around with mowers and the like. As a result of the difficulty in maneuvering around such memorials, cemeteries have promulgated rules requiring that decorations such as flowers, plant, plastic flowers and the like, must be removed prior to the days that the mowing and trimming is to be performed. Persons placing such decorations near a grave generally prefer for their decorations to be displayed for as long as possible, if not permanently, and thus are greatly inconvenienced by the requirement that these decorations are to be temporarily removed from the gravesite so that the groundskeepers may cut and trim the lawn.

The flower saddle for tombstones disclosed by Nesbitt and Sievers in U.S. Pat. No. 4,640,045, the flower pot supporting attachment for cemetery monuments disclosed by Boser and Mares in U.S. Pat. No. 3,310,911, and the floral display support for gravestones disclosed by Clark in U.S. Pat. No. 3,511,461 all disclose various types of saddle planters devices adapted to be mounted on a gravestone. All of these saddle planter devices are attachable to the gravestone by a wide variety of different types of brackets having cushioned legs that are designed to supply sufficient forces to the front and rear of the gravestone so that these saddle planter devices are held in place. One shortcoming of these types of devices is that they lack flexibility in adapting the device to mount onto the wide variety of different types styles of gravestones in existence today. In addition, these devices are likely to incorporate certain metallic components that will likely cause discoloration runoff marks down the surface of the gravestone when the metals are exposurde to the elements. Another drawback is that these devices is that they require the grieving user to use various tools to mount these device securely onto the stone. As a result, the user may view the requisite mounting process to be an unduly burdensome and complicated task. Furthermore, the user is also likely to improperly mount these devices and as a result these devices are subject to shifting or even falling off the gravestone.

The gravestone saddle planter disclosed by Quackenbush in U.S. Pat. No. 5,072,541 discloses a saddle planter that includes a bracketing leg configuration for supplying a horizontal force to the front and rear of the gravestone so that the saddle is secured in an upright alignment on the gravestone. One drawback with the Quackenbush '541 is that the device is not readily adaptable to a wide variety of gravestone widths that are in existence today. As a result, the Quackenbush disclosed device may not exert sufficient force to maintain the saddle planter in the upright position if the gravestone is too narrow. Another drawback to the Quakenbush device is that the center of gravity of the flower pot is necessarily above the point of securement onto the gravestone, so that the flower pot saddle is prone to being easily toppled by a horizontal or sideways force exerted upon the device. Therefore, the Quackenbush '541 device is subject to being misaligned or even toppled by horizontal forces such as the force exerted by a strong wind or the force exerted by a sideways push from a vandal terrorizing the cemetery.

The gravestone flower holder disclosed by Cassette in U.S. Pat. No. 5,519,966 discloses a holder for supporting flowers proximal to a gravestone having a plurality of apertures extending therethrough for receiving flower stems. One drawback to the Cassette disclosed device is that it is only envisioned to support a mesh screen member capable of holding only cut flowers. Therefore, the Cassette disclosed device does not envision a supportable flowerpot.

While all of the above-described devices fulfill their respective, particular objectives and requirements, the aforementioned patents do not describe a kit which is capable of allowing a grieving user to easily and conveniently construct a gravestone flower planter which is capable of being mounted above the cemetery lawn by being suspendable from the top portion of a gravestone so that the center of gravity of the device is below the attachment point(s) on the gravestone. Furthermore, none of the aforementioned patents describe a kit that is capable of allowing a user to custom fit the size of the planter around the top portion of the gravestone so that it evenly matches the perimeter of the gravestone.

Therefore, a need exists for a new and improved gravestone planter and kit that can be used to easily construct a gravestone planter which can be mounted above the cemetery lawn by being conveniently suspendable in a stable manner from the top portion of the gravestone as well as allowing a user to custom fit the planter to neatly wrap it around the top of the gravestone.

In this respect, the gravestone planter and kit according to the present invention substantially departs from the conventional concepts and designs of the prior art, and in doing so provides an apparatus primarily developed for the purpose of allowing a user to easily construct a gravestone planter that can be mounted well above the cemetery lawn by being conveniently suspendable in a stable manner from the top portion of the gravestone as well as allowing a user to custom fit the design of the planter to fit around the top of the gravestone.

SUMMARY OF THE INVENTION

A gravestone planter and kit that is capable of being used to construct a generally rectangular flower box having a continuous open trough capable of retaining potting soil and having a central open cavity in the middle of the flower box. The width and length dimensions of the constructed flower box are adjustable by slidably moving the four separate interconnected corner pieces. By adjusting the width and length of the constructed flower box the central cavity can be expanded to substantially match the particular dimensions of the top of a given post, such as the top of a gravestone. The dimensionally adjusted flower box may then be mounted around the top of any post that the central cavity of the flower box fits around. Mounting the flower box around the top of a given post is achieved by using at least one strap attached to two opposing sides of the flower box, so that the middle of the strap contacts the top portion of the post. The flower box is consequently suspended around the top of the post by using gravity to secure the flower box in place.

In view of the foregoing disadvantages inherent in the known type of gravestone planters now present in the prior art, the present invention provides an improved gravestone planter and kit, which will be described subsequently in great detail, which is capable of being used to construct a new and improved gravestone planter, and which is not anticipated, rendered obvious, suggested, or even implied by the prior art, either alone or in any combination thereof.

To attain this, the present invention essentially comprises a generally rectangular gravestone planter and associated kit capable of making a planter having a continuous open trough that can retain potting soil and has a central open cavity in the middle of the planter. The gravestone planter comprises a suspension strap and four interconnected corner pieces that are slidably attached to one another.

There has thus been outlined, rather broadly, the more important features of the invention in order that the detailed description thereof that follows may be better understood, and in order that the present contribution of the art may be better appreciated.

The present invention of the kit may also include duct tape so that the trough may be made watertight so that water may be held in the trough in order to nourish freshly cut flowers placed in the planter. The kit may also include a bag of potting soil so that the user may conveniently construct a living flower garden in the constructed planter. There are of course, additional features of the invention that will be described hereinafter and which form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be used as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved gravestone planter and kit for a gravestone planter that has all the advantages of the prior art gravestone planter devices and none of the disadvantages.

It is another object of the present invention to provide a new and improved gravestone planter and kit for a gravestone planter that may be easily and efficiently manufactured and marketed.

An even further object of the present invention is to provide a new and improved gravestone planter and kit for a gravestone planter kit that has a low cost of manufacture with regard to both materials and labor, and which accordingly is then susceptible of low prices of sale to the consuming public, thereby making such multipurpose storage unit and system economically available to the buying public.

Still another object of the present invention is to provide a new gravestone planter and kit that provides in the apparati and method some of the advantages of the prior art, while simultaneously overcoming some of the disadvantages normally associated therewith.

One another object of the present invention is to provide a gravestone planter and kit for a gravestone planter that it is dimensionally adjustable along both the width and the length of the planter.

Another object of the present invention is to provide a gravestone planter and kit for a gravestone planter that has a central cavity of the planter that is also adjustable so that the central cavity may be used to fit around any given post such as a gravestone.

Yet another object of the present invention is to provide a gravestone planter and kit for a gravestone planter which is capable of being mounted above the cemetery lawn by being suspended from at least one strap which contacts the top portion of the gravestone. In doing so, the present invention offers the user a gravestone monument decoration which is aesthetically pleasing device which is simple to construct and to mount onto a gravestone and stable manner.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
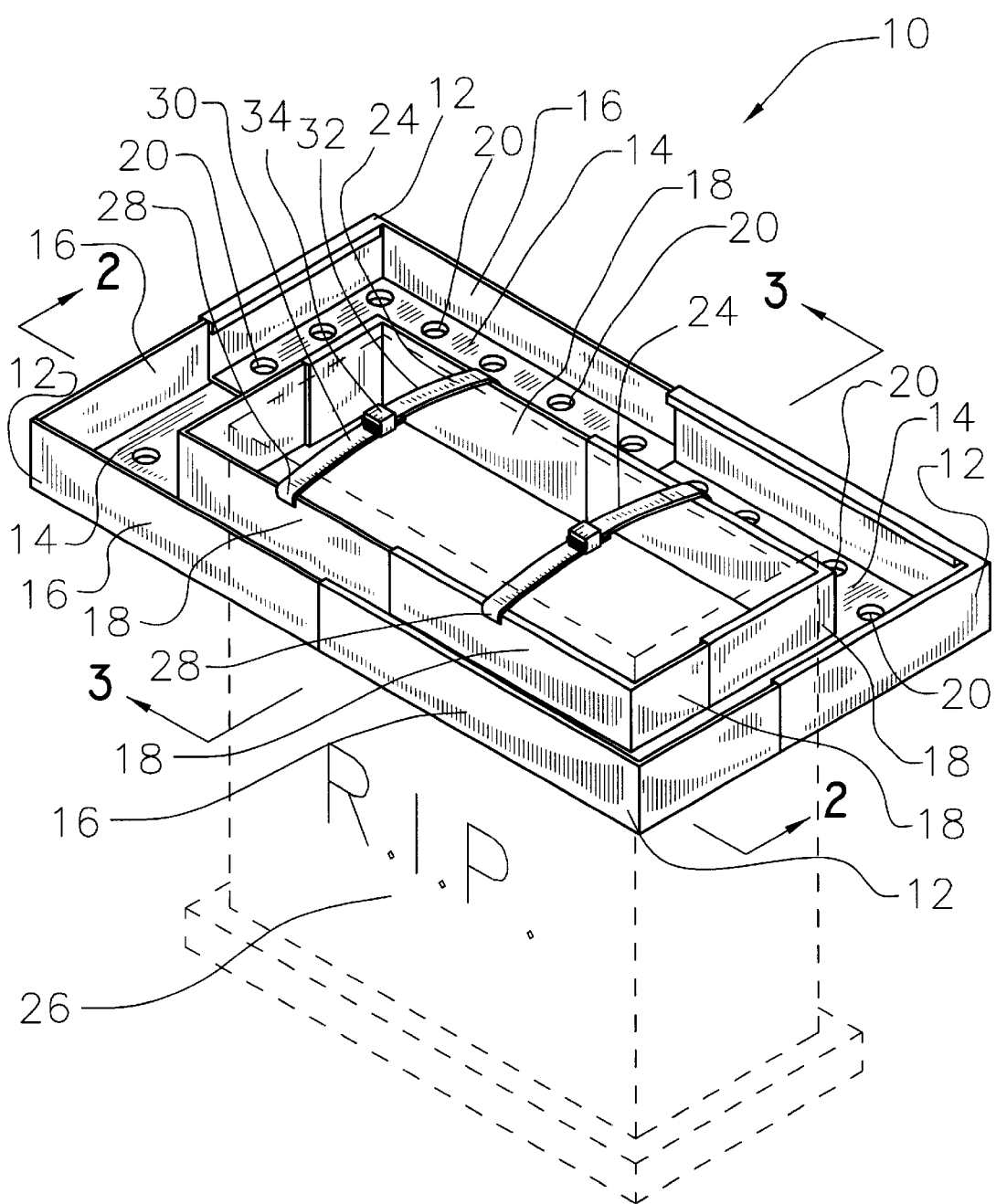
FIG. 1 is a perspective view of the preferred embodiment of the gravestone planter constructed in accordance with the principles of the present invention.

Referring now to the drawings, and in particular FIGS. 1 to 4 thereof, one preferred embodiment of the present invention is shown and generally designated by the reference numeral 10. Shown here is a first current embodiment of a gravestone planter 10, which comprises a first corner piece 12, second corner piece 12, third corner piece 12 and fourth corner piece 12, wherein each corner piece 12 has a generally L-shape configuration and a bottom wall 14; a front wall 16; a back wall 18; a first end; and a second end. The first end of the first corner piece 12 is capable of slidably receiving the first end of the second corner piece 12; the second end of the third corner piece 12 is capable of slidably receiving the second end of the second corner piece 12; the first end of the third corner piece 12 is capable of slidably receiving the first end of the fourth corner piece 12; and the second end of the first corner piece 12 is capable of slidably receiving the second end of the fourth corner piece 12. Thereby the first corner piece 12, second corner piece 12, third corner piece 12, and fourth corner piece 12 are capable of being interconnected with each other by slidably receiving the ends of each corner piece 12 together to form a substantially rectangular two-dimensionally adjustable gravestone planter 10 having a continuous open trough capable of retaining potting soil. The gravestone planter 10 made from the interconnected four corner pieces 12 also has a central open cavity which is capable of being enlarged by telescoping the slidably received ends of the interconnected corner pieces 12 so that the central open cavity can receive a top portion of a gravestone 26. Finally, this preferred embodiment comprises at least one strap 24 capable of being attached to opposing corner pieces 12, wherein the strap 24 is capable of contacting the top portion of the gravestone 26 and gravity suspending the gravestone planter 10 around the circumference of the top portion of the gravestone 26.

Figure 2:
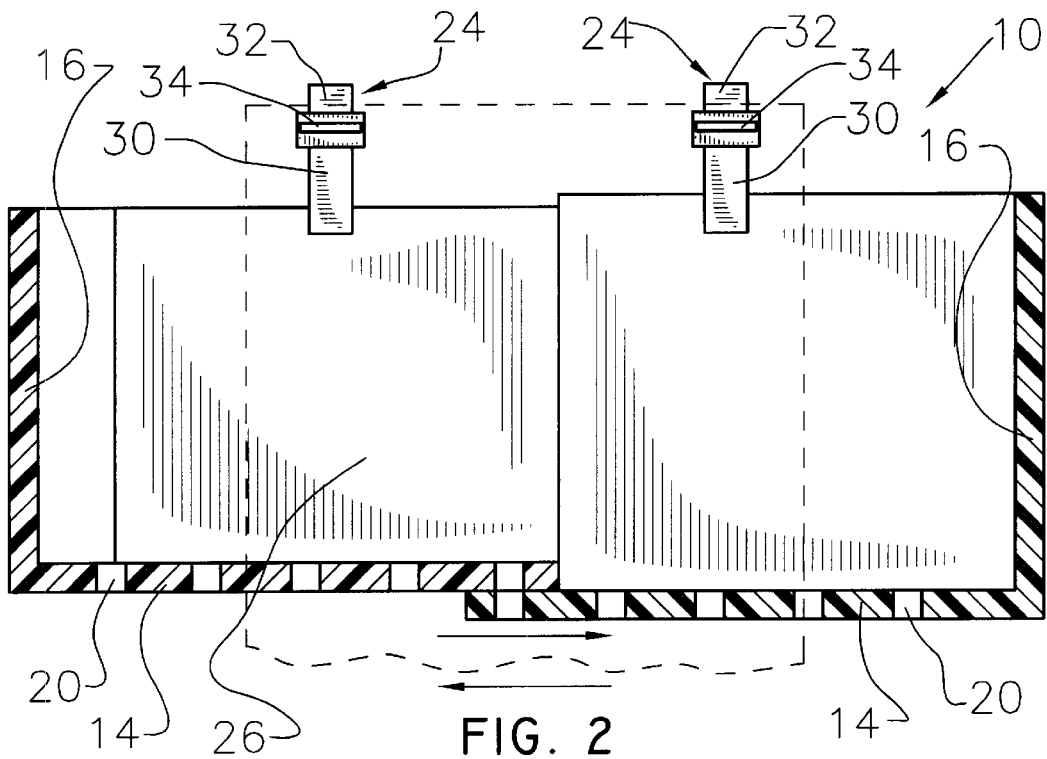
FIG. 2 is a cross section view of the gravestone planter of the present invention.
Figure 3:
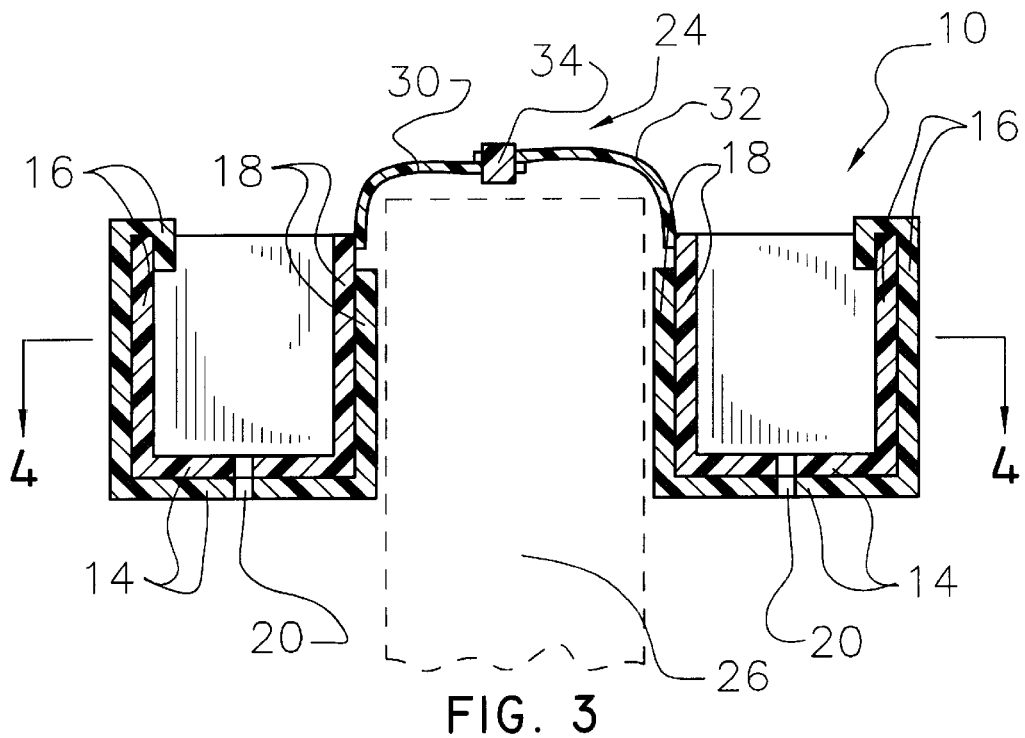
FIG. 3 is a cross section view of the gravestone planter of the present invention.
Figure 4:
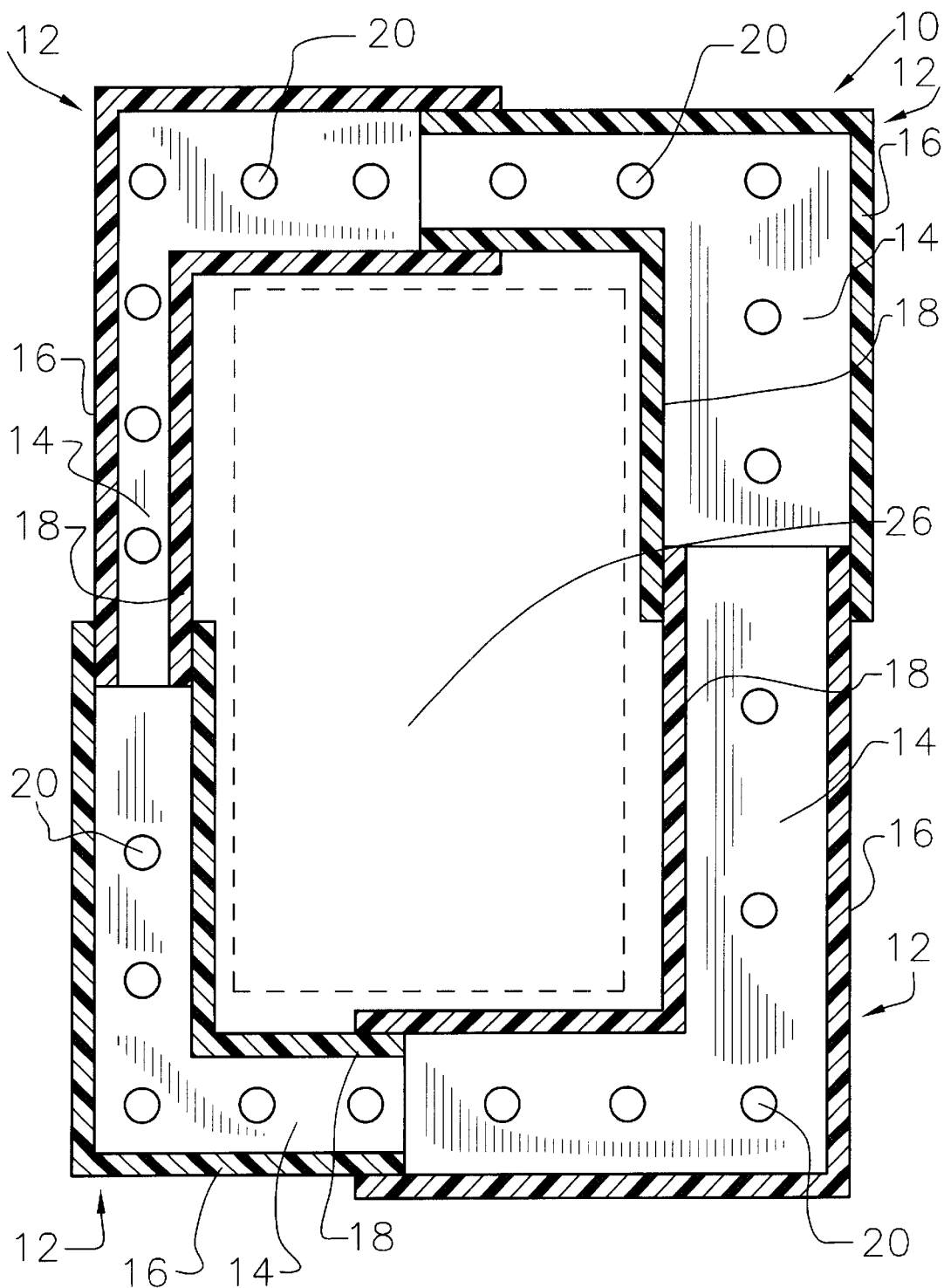
FIG. 4 is an overhead view of the gravestone planter of the present invention.

This current embodiment may also have a number of additional optional limitations associated with the required elements of the present invention. First, the strap 24 may be optionally attachable to the back walls 18 of the opposing corner pieces 12 of the gravestone planter 10 as shown in FIGS. 1, 2 and 3. Second, the four corner pieces 12 may be made of plastic. Third, the strap may also be made of plastic. Fourth, the strap 24 may optionally be composed of a left piece 30, a right piece 32 and a buckle 34, in which the overall length of the strap 24 is capable of being adjusted by overlapping together the left piece 30 of the strap 24 over the right piece 32 of the strap 24 and lockably joining the overlapped left piece 30 and right piece 32 together with the buckle 34. Fifth, the strap 24 may optionally have a hook element 28 (shown in FIGS. 1) on each end of the strap 24 for engaging the opposing corner pieces 12. Sixth, each of the corner pieces 12 may optionally have an aperture (not shown) along the inside wall capable of engaging the hook element 28. Finally, the first corner piece 12, second corner piece 12, third corner piece 12 and fourth corner piece 12 may also optionally have a plurality of drain holes 20 in each of the respective bottom walls 14.

This current embodiment may also have a number of optional additional elements. For example, the gravestone planter 10 may also optionally further comprise a roll of duct tape (not shown). The duct tape may be used for water proofing the bottom walls 14 of the first corner piece 12, second corner piece 12, third corner piece 12 and fourth corner 14 so that the trough of the gravestone planter 10 can be converted so that it is capable of retaining water so that freshly cut flowers placed in the trough can be nourished. The gravestone planter 10 may also optionally comprise a bag of potting soil for filling the gravestone planter 10 with potting soil. Finally, the grave stone planter kit may optionally have two straps 24.

In another current embodiment, the gravestone planter 10 comprises all of the required elements described in the previously described embodiment except that the first end of each corner piece 12 is larger than the second end of that piece 12. In this preferred embodiment each first end of the each corner piece 12 is capable of slidably receiving the second end of any other corner piece 12.

Finally, a third preferred embodiment of the gravestone planter 10 comprises all of the above-mentioned necessary elements in the first preferred embodiment except the first end of the first corner piece 12 comprises a means for slidably joining the second end of the second corner piece 12. Also, the first end of the second corner piece 12 comprises a means for slidably connecting the second end of the third corner piece 12. In addition, the first end of the third corner piece 12 has a means for slidably attaching to the second end of the fourth corner piece 12. Finally, the first end of the fourth corner piece 12 has a means for slidably coupling to the second end of the first corner piece 12. In this third preferred embodiment the first, second, third and fourth corner pieces 12 are capable of being interconnected with each other to form a substantially rectangular, two-dimensionally-adjustable gravestone planter 10 having a continuous open trough capable of retaining potting soil and having a central open cavity capable of being enlarged by telescoping the ends of the interconnected corner pieces 12, so that the central open cavity can receive a top portion of a gravestone 26.

As to the manner of usage and operation of the present invention, the same should be apparent from the above description. Accordingly, no further discussion relating to the manner of usage and operation will be provided.

While a preferred embodiment of the gravestone planter and kit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any sturdy material such as metal, cardboard, or a variety of wood may be used instead of the plastic described.

And although the gravestone planter and kit has been described, it should be appreciated that the gravestone planter and kit herein described is also suitable for use in constructing various other flower planters on any number of different erect structures, such as suspending a planter on a hand rail, on a short wall or even mounting a flower planter around a mailbox.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gravestone planter kit comprising:
   a first, second, third and fourth flower box corner piece, each corner piece having a generally L-shape configuration and having:
   a bottom wall;
   a front wall;
   a back wall;
   a first end; and
   a second end,
      wherein the first end of said first corner piece slidably receives the first end of said second corner piece, the second end of said third corner piece slidably receives the second end of said second corner piece, the first end of said third corner piece slidably receives the first end of said fourth corner piece, the second end of the first corner piece slidably receives the second end of said fourth corner piece,
      whereby said first, second, third and fourth corner pieces are interconnected with each other by slidably receiving the ends of each corner piece together to form a substantially rectangular two dimensionally adjustable flower box planter having a continuous open trough for retaining potting soil and having a central open cavity enlarged by telescoping the slidably received ends of the interconnected corner pieces so that the central open cavity receives a top portion of a gravestone, and
   at least one strap attached to opposing corner pieces, wherein said strap contacts top portion of the gravestone and gravity suspending the flower box planter around the circumference of the top portion of the gravestone.

2. The gravestone planter kit described in claim 1, wherein said strap is attached to the back walls of said opposing corner pieces of the flower box planter.

3. The gravestone planter kit described in claim 1, wherein said strap comprises a left piece, a right piece and a buckle, wherein the length of the strap is adjusted by overlapping together said left and right pieces of said strap and lockably joining said left and right pieces of said strap together with said buckle.

4. The gravestone planter kit described in claim 1, wherein said strap having a hook element on each end of said strap for engaging said opposing corner pieces.

5. The gravestone planter kit described in claim 4, wherein each of said corner pieces having a aperture along the inside wall engaging said hook element.

6. The gravestone planter kit described in claim 1, wherein said first, second, third and fourth flower box corner pieces having a plurality of drain holes in said bottom walls.

7. The gravestone planter kit described in claim 1, further comprising a roll of duct tape for water proofing the bottom walls of said first, second, third and fourth flower box corner pieces wherein the trough of the flower box planter retains water so that freshly cut flowers placed in the trough can be nourished.

8. The gravestone planter kit described in claim 1, further comprising a bag of potting soil for filling the flower box planter with potting soil.

9. The gravestone planter kit described in claim 1, wherein said first, second, third, and fourth corner pieces are made of plastic and said strap is made of plastic.

10. The grave stone planter kit described in claim 1, wherein said at least one strap comprises two straps.

11. A gravestone planter kit comprising:
    a first, second, third and fourth flower box corner piece, each corner piece having a generally L-shape configuration and having:
    a bottom wall;
    a front wall;
    a back wall;
    a small end; and
    a large end,
       wherein the large end of said first corner piece slidably receives receiving the small end of said second corner piece,
       wherein the large end of said second corner piece slidably receives receiving the small end of said third corner piece,
       wherein the large end of said third corner piece slidably receives receiving the small end of said fourth corner piece,
       wherein the large end of said fourth corner piece slidably receives receiving the small end of said first corner piece,
       whereby said first, second, third and fourth corner pieces interconnected with each other by slidably receiving the ends of each corner piece together to form a substantially rectangular two dimensionally adjustable flower box planter having a continuous open trough for retaining potting soil and having a central open cavity enlarged by telescoping the slidably received ends of the interconnected corner pieces so that the central open cavity can receive a top portion of a gravestone, and
    at least one strap attached to opposing corner pieces, wherein said strap contacts the top portion of the gravestone and gravity suspending the flower box planter around the circumference of the top portion of the gravestone.

12. The gravestone planter kit described in claim 11, wherein said is attached to the back walls of said opposing corner pieces of the flower box planter.

13. The gravestone planter kit described in claim 11, wherein said strap comprises a left piece, a right piece and a buckle, wherein the length of the is adjusted by overlapping together said left and right pieces of said strap and lockably joining said left and right pieces of said strap together with said buckle.

14. The gravestone planter kit described in claim 11, wherein said strap having a hook element on each end of said strap for engaging said opposing corner pieces.

15. The gravestone planter kit described in claim 14, wherein each of said corner pieces having a aperture along the inside wall engages said hook element.

16. A method of using a gravestone planter kit for assembling and mounting a flower box over a given post, said method comprising the steps of:
    obtaining the kit consisting:
    a first, second, third and fourth flower box corner piece, each corner piece having a generally L-shape configuration and having:
    a bottom wall;
    a front wall;
    a back wall;
    a first end; and
    a second end,
       wherein the first end of the first corner piece slidably receives receiving the first end of the second corner piece, the second end of the third corner piece slidably receives receiving the second end of the second corner piece, the first end of the third corner piece slidably receives the first end of the fourth corner piece, the second end of the first corner piece slidably receives the second end of the fourth corner piece, whereby the first, second, third and fourth corner pieces are interconnected with each other by slidably receiving the ends of each corner piece together to form a substantially rectangular two dimensionally adjustable flower box planter having a continuous open trough for retaining potting soil and having a central open cavity enlarged by telescoping the slidably received ends of the interconnected corner pieces so that the central open cavity can receive a top portion of a gravestone, at least one strap attached to opposing corner pieces, wherein the strap is contacts the top portion of the gravestone and gravity suspending the flower box planter around the circumference of the top portion of the gravestone, wherein the strap attached to the back walls of the opposing corner pieces of the flower box planter, wherein the strap having a hook element on each end of the strap for engaging the opposing corner pieces, wherein each of the corner pieces having a aperture along the inside wall engages the hook element, wherein the first, second, third and fourth flower box corner pieces having a plurality of drain holes in the bottom walls;

a roll of duct tape for water proofing the bottom walls of the first, second, third and fourth flower box corner pieces wherein the trough of the flower box planter retains water so that freshly cut flowers placed in the trough can be nourished; and a bag of potting soil for filling the flower box planter with potting soil;

placing together the first end of the first corner piece with the first end of the second corner piece so that the first end of the first corner piece is slidably received together with the first end of the second corner piece;

positioning together the second end of the third corner piece with the second end of the second corner piece so that the second end of the third corner piece is slidably received together with the second end of the second corner piece,;

aligning together the first end of the third corner piece with the first end of the fourth corner piece so that the first end of the third corner piece is slidably received together with the first end of the fourth corner piece, putting together the second end of the first corner piece with the second end of the fourth corner piece so that the second end of the first corner piece is slidably received together with the second end of the fourth corner piece, whereby said steps of placing, positioning, aligning, and putting constitute building the rectangular two dimensionally adjustable flower box planter;

adjusting the central open cavity of the flower box planter by telescoping the interconnected corner pieces so that the central open cavity can receive the top portion of the gravestone;

attaching the strap to the back walls of the opposing corner pieces of the flower box planter;

adhering a portion of the roll of duct tape to the bottom walls of the first, second, third and fourth flower box corner pieces so that the trough of the flower box planter is water proofed; and filling the flower box planter with potting soil from the bag of potting soil.

* * * * *